United States Patent
Hallonet

(10) Patent No.: US 10,259,473 B2
(45) Date of Patent: Apr. 16, 2019

(54) METHOD FOR OPTIMIZING PASSENGER COMFORT IN A RAILWAY VEHICLE

(71) Applicant: ALSTOM TRANSPORT TECHNOLOGIES, Saint-Ouen (FR)

(72) Inventor: Frédéric Hallonet, La Jarne (FR)

(73) Assignee: ALSTOM TRANSPORT TECHNOLOGIES, Saint-Ouen (FR)

( * ) Notice: Subject to any disclaimer, the term of this patent is extended or adjusted under 35 U.S.C. 154(b) by 0 days.

(21) Appl. No.: 15/427,756

(22) Filed: Feb. 8, 2017

(65) Prior Publication Data

US 2017/0225697 A1   Aug. 10, 2017

(30) Foreign Application Priority Data

Feb. 9, 2016   (FR) ..................... 16 50996

(51) Int. Cl.
*B61F 5/24*      (2006.01)
*B61L 23/04*     (2006.01)
(Continued)

(52) U.S. Cl.
CPC .............. *B61F 5/245* (2013.01); *B60G 17/00* (2013.01); *B60G 17/016* (2013.01);
(Continued)

(58) Field of Classification Search
CPC .. B60G 17/00; B60G 17/016; B60G 17/0165; B60G 2300/10; B60G 2300/102; B61F 5/245; B61F 5/38; B61L 23/042
See application file for complete search history.

(56) References Cited

U.S. PATENT DOCUMENTS

| 5,809,448 A | 9/1998 | Gimenez et al. |
| 5,928,297 A * | 7/1999 | Murata et al. ....... B60G 17/016 |
| | | 701/37 |

(Continued)

FOREIGN PATENT DOCUMENTS

| JP | 2003237573 | 8/2003 |
| KR | 101082764 | 11/2011 |

OTHER PUBLICATIONS

Preliminary Search Report for FR 1650996, completed Oct. 26, 2016.

*Primary Examiner* — Dale W Hilgendorf
(74) *Attorney, Agent, or Firm* — B. Aaron Schulman, Esq.; Stites & Harbison, PLLC

(57) ABSTRACT

The vehicle including an active suspension system (22) parameterized by a set of adjustment parameters. The railway track is cut into segments. For each segment (T), the method includes campaigns for optimization of the set of parameters, such that: during the first campaign, to each passage of the suspension system (22) on the segment (T), a first set of parameters, specific to this passage, is predefined and applied to the suspension system (22), and a comfort quality index is calculated, and then a metaheuristic algorithm is applied for determining second sets of parameters, and during each following optimization campaign, at each passage of the suspension system over the segment, one of the determined sets of parameters by the previous optimization campaign is applied to the suspension system, and the comfort quality index is calculated, and then the metaheuristic algorithm is applied in order to determine new sets of parameters.

9 Claims, 1 Drawing Sheet

(51) Int. Cl.
*B60G 17/00* (2006.01)
*B60G 17/016* (2006.01)
*B60G 17/0165* (2006.01)
*B61F 5/38* (2006.01)

(52) U.S. Cl.
CPC ............ *B60G 17/0165* (2013.01); *B61F 5/38* (2013.01); *B61L 23/042* (2013.01); *B60G 2300/10* (2013.01); *B60G 2300/102* (2013.01); *B61L 2201/00* (2013.01)

(56) References Cited

U.S. PATENT DOCUMENTS

| | | | |
|---|---|---|---|
| 7,168,709 B2 * | 1/2007 | Niwa et al. ........ | B60G 17/0165 701/37 |
| 2010/0023190 A1 * | 1/2010 | Kumar et al. ........ | B61L 23/042 701/20 |
| 2016/0210854 A1 | 7/2016 | Van Laethem et al. | |
| 2016/0244076 A1 * | 8/2016 | Hyde et al. ........... | B61L 23/042 |
| 2018/0079272 A1 * | 3/2018 | Aikin ................. | B60G 17/0165 |

\* cited by examiner

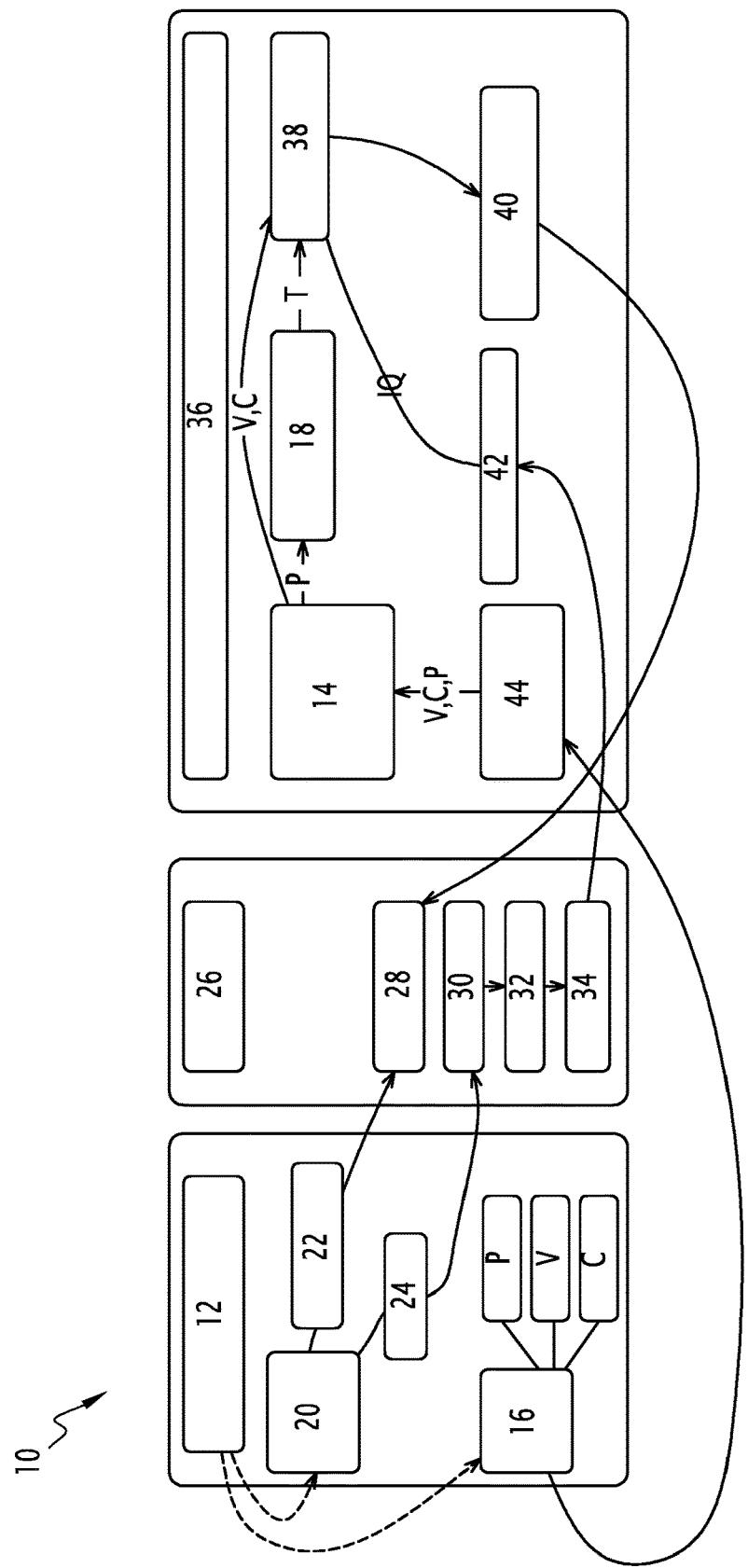

METHOD FOR OPTIMIZING PASSENGER COMFORT IN A RAILWAY VEHICLE

BACKGROUND OF THE INVENTION

The present invention relates to an optimization method, continuously all along the life of the equipment, for the comfort in a railway vehicle circulating on a railway track.

The comfort in a railway vehicle particularly depends on three main variables, which are the speed of the vehicle, the condition of the railway track, and the load borne by the vehicle.

In order to improve this comfort, railway vehicles conventionally include at least one suspension system, inserted between the wheels and the body of the vehicle.

A "suspension system" designates a set of elements contributing to controlling the relative movements of the body with respect to the chassis of bogies bearing this body, and of the bogie chassis relatively to the axles of these bogies. These elements may be seen independently from one vehicle to the other in a train or tramway set.

More particularly, there exist suspension systems with constant stiffnesses, these stiffnesses being selected so that the suspension system is efficient on track sections comprising singularities which are detrimental for comfort. However, such stiffnesses are not adapted to the other track sections, and may therefore be uncomfortable on these other track segments. The unsuitability of these stiffnesses generates discomfort for passengers and harmful mechanical stresses for the fatigue lifetime of the equipment (tracks, bogies, and body structures).

There also exist so-called "active" suspension systems, for which the stiffness may be controlled in order to be adapted to diverse circulation conditions of the vehicle. However, the control of such suspension systems is generally basic, for example only depending on the speed of the vehicle.

BRIEF DESCRIPTION OF THE INVENTION

The object of the invention is notably to improve the situation, by proposing a method for optimizing comfort in a railway vehicle, able to optimize, continuously, an active suspension system.

For this purpose, the object of the invention is notably a method for optimizing comfort in a railway vehicle circulating on a railway track, the railway vehicle including at least one active suspension system parameterized by a set of adjustment parameters, characterized in that:
the railway track is cut into segments
for each segment, the method includes campaigns for optimizing the set of adjustment parameters, such that:
during the first optimization campaign, at each passage of the suspension system on the segment, a first set of adjustment parameters, specific to this passage, is predefined and applied to the suspension system, and a comfort quality index is calculated, and then a metaheuristic algorithm is applied for determining second sets of adjustment parameters,
during each following optimization campaign, at each passage of the suspension system on the segment, one of the set of adjustment parameters determined by the previous optimization campaign is applied to the suspension system and the comfort quality index is calculated, and then the metaheuristic algorithm is applied for determining new sets of adjustment parameters.

The method according to the invention gives the possibility of optimizing all the adjustment parameters of the suspension system.

It should be noted that these adjustment parameters cannot be inferred by a simple calculation depending on input variables, such a calculation being too complex given the large variety of input variables, notably the variability of the tracks overtime, the effective load of the vehicle, the instantaneous speed, the wear of the wheels, etc.

Therefore the invention intends to determine the optimized adjustment parameters by performing optimization campaigns, by determining the adjustment parameters used in each campaign by means of a metaheuristic algorithm.

Here "an optimization campaign" designates the sufficient accumulation of comfort data relatively to sets of suspension adjustment parameters, by circulations on a given segment for given speed ranges and load ranges. This accumulation of data gives the possibility to the algorithm of inferring sets of parameters theoretically more favorable to comfort, sets which will be evaluated during the following campaign.

By iterating the optimization campaigns a sufficient number of times, the adjustment parameters converge towards optimal values and are for example inputted into a database. This database may thus indicate, via an algorithm, the optimum adjustment parameters for given variables. The database retains the history of the tested sets as well as the optimum ones. Thus, the method according to the invention is of the "machine learning" type.

A method according to the invention may further include one or several of the following features, taken alone or according to any technically conceivable combinations.

The parameters of the first sets of parameters are selected in predetermined respective safety intervals.

The parameters of the first sets of parameters are randomly determined.

The metaheuristic algorithm is a genetic algorithm.

The cutting out of the railway track into segments is adaptive, with segments of variable length, established according to singularities of the track.

The optimization campaigns are common to several vehicles circulating on the same railway track, the vehicles then being able to put the data relative to each optimization campaign in common.

The invention also relates to a device for controlling comfort in a railway vehicle, for applying the comfort optimization method as defined earlier, characterized in that it includes:
at least one active suspension system, adjustable by means of a set of parameters,
a system for controlling the set of parameters of the suspension system,
means for evaluating the comfort in the railway vehicle, and
optimization means able to determine optimized sets of parameters by carrying out a plurality of optimization campaigns.

A device according to the invention may further include one or several of the following features, taken alone or according to all the technically conceivable combinations.

The optimization means include a database, able to be updated at each optimization campaign, indicating sets of parameters depending on track segments, on speeds and loads of the vehicle.

The optimization means include means for generating sets of parameters optimized by a metaheuristic algorithm, able to generate a set of optimized parameters by applying a metaheuristic algorithm to a determined set of parameters during a previous optimization campaign.

The invention will be better understood upon reading the description which follows, only given as an example and made with reference to the single appended FIGURE, schematically illustrating an optimization device according to an exemplary embodiment of the invention, and the interaction between its components for applying the method according to the invention.

BRIEF DESCRIPTION OF THE SEVERAL VIEWS OF THE DRAWINGS

In the FIGURE, a comfort optimization device 10 is illustrated in a railway vehicle 12 circulating on a railway track.

DETAILED DESCRIPTION OF THE INVENTION

The railway track is cutout beforehand into successive segments. For this purpose, several methods for cutting out the railway track are conceivable.

For example, the railway track may simply be cut out into segments with equal lengths.

Alternatively, it is possible to cut out the railway track into different track portions, depending on the maximum circulation speed on these track portions, and then to cutout each track portion into segments with a constant cutting out pitch specific to this track portion.

It is also possible to provide an adaptive cutting out, with segments of variable lengths, established according to the known or detected singularities of the track, during a previous passage over the track. Thus, a segment with a singularity detrimental to comfort may be short, while a segment without any notable singularity may be long.

The length of the segments may be of any length. However, the shorter the segments, the more comfort will be optimized, since it adapts more rapidly to the specificities of the track.

In every case, the cutting out of the track into segments is recorded in a database 14, which is preferably loaded onboard the vehicle 12, or alternatively remotely stored in a control station.

The vehicle 12 includes means 16 for determining input variables, these input variables being the position P of the vehicle on the track, its speed V and its load C. These input variables have an influence on the comfort felt by the passengers in the vehicle 12.

Other variables which are difficult to quantify, such as the mechanical stresses on the body-bogie links, may also have an influence on this comfort.

The position P is for example determined by a conventional satellite guidance device (GPS). This position P will give the possibility, by means of a correspondence table 18, of determining on which track segment T the vehicle 12 is found depending on its position P determined by GPS.

The speed V as for it is determined by means of a conventional speed measurement device, such as those conventionally loaded onboard railway vehicles.

Finally, the load C is measured by means of a conventional load-measuring device.

The vehicle 12 moreover includes diverse pieces of equipment 20, comprising at least one active suspension system 22.

The suspension system 22 is of the "active" type, i.e. its features, notably its damping thickness, are adjustable, by means of a set of adjustment parameters.

The suspension system 22 notably includes active dampers, notably with variable viscosity and variable tearing, an anti-roll bar possibly active, advantageously movable ballast, active travel limitation abutments, etc. The set of adjustment parameters comprises all the parameters having an influence on these elements making up the suspension system 22.

For example, the parameters include damper viscosity values, damper tearing values, anti-roll bar stiffness values, free travels of the abutments, etc.

The pieces of equipment 20 moreover include sensors 24, giving the possibility of estimating comfort in the railway vehicle 12. For example, the sensors 24 include accelerometers, for example measuring the accelerations in three spatial directions, notably longitudinally, transversely and in height. Indeed, too high accelerations, for example, are sources of discomfort.

The vehicle 12 also includes an onboard piece of hardware equipment 26.

The piece of hardware equipment 26 includes means 28 for controlling the suspension system 22. These control means 28 are able to apply, to the suspension system 22, a set of adjustment parameters determined beforehand.

The piece of hardware equipment 26 moreover includes an acquisition chain 30 connected to the sensors 24, for collecting the values measured by these sensors 24, means 32 for conditioning signals for example allowing low-pass frequency filtering of the accelerations, and buffer recording means 34 of the values measured by the sensors according to the covered segment T.

The optimization device 10 finally includes a software portion 36, for example installed on the piece of hardware equipment 26. More particularly, the optimization device 10 includes a computer system for applying the software portion 36.

The software portion 36 includes an optimization module 44 for optimizing the adjustment parameters.

This optimization module 44 notably includes the database 14 mentioned earlier.

This database 14 includes the correspondence table 18, giving the possibility, when the determination means 16 provide the position P of the vehicle 12, of indicating on which segment T this vehicle 12 is found.

The database 14 also includes a table of parameters 38, able to provide a set of adjustment parameters depending on the speed V range, on the load C range and on the segment T.

The software portion 36 moreover includes means 40 for generating optimized sets of parameters by the metaheuristic algorithm.

The software portion 36 moreover includes means 42 for calculating a comfort quality index IQ, according to the data provided by the recording means 34.

The present invention aims at improving the comfort related to the movements of the vehicle notably resulting from track defects which transmit parasitic forces through the suspension system of the vehicle (springs, dampers, anti-roll bars). The comfort quality index IQ is calculated from three-dimensional accelerations measured in the body of the vehicle by the sensors 24, which are therefore felt by the passengers.

Standards give the possibility of evaluating a comfort level from measurements of acceleration to which the body is subject. This comfort level is noted as Nmv. The lower the comfort level Nmv, better is the perceived comfort.

An exemplary embodiment for calculating the comfort level Nvm will be described below. This calculation method is normalized.

The comfort quality index IQ is built from the comfort level Nvm. The comfort quality index IQ is used for evaluating the quality of a configuration of the vehicle having active dampers which may therefore be adjusted in stiffness (tearing). The comfort quality index IQ is therefore better if its value is high.

The comfort level Nmv and the comfort quality index IQ are calculated by the following calculation steps:
  measurement of the accelerations by the sensors 24, on the given segment,
  applying a frequency low-pass filter for the accelerations, by the signal conditioning means 32. The low-pass filter is for example of the Wd type, according to the standard EN 12299;
  Calculation of the root mean square value Rms (also called an effective value Aeff):

$$A_{\text{eff}} = \sqrt{\frac{1}{T}\int_0^T [a(t)^{Wd}]^2 dt}$$

Wherein:
Aeff is the effective value calculated over a period T,
T is a duration over which is calculated the average. For example, T=5 seconds,
$\lfloor a(t)^{Wd} \rfloor$ is the time acceleration signal which was filtered by the «Wd» filter.
  Selecting RMS values corresponding to the 95$^{th}$ centiles: the question here is to select the acceleration values in x, y and z which cover 95% of the filtered acceleration levels.
  Calculation of the comfort Nmv on the covered segment:

$$Nmv = 6\sqrt{a_{x95}^{2Wd} + a_{y95}^{2Wd} + a_{z95}^{2Wd}}$$

Construction of the Quality index (of the comfort) for the optimization needs:

$IQ=1/Nmv^2$

Wherein Nmv is the comfort level for an individual therefore with a set of given parameters.

The operation of the optimization device 10 will now be described, within the scope of an optimization method according to the invention.

As indicated earlier, the optimization method includes beforehand the cutting out of the railway track into segments, and the storage, in the database 14, of the characteristics of these segments. For example, the segments are numbered, and the database 14 includes, for each segment number, the input number of kilometers and the output number of kilometers of this segment. The position P of the vehicle 12, obtained by the satellite guidance system, therefore easily allows determination of the number of the segment on which this vehicle 12 is found.

For each segment T, the method includes campaigns for optimizing sets of adjustment parameters. A "an optimization campaign" for a segment T corresponds to sufficient accumulation of comfort data on this segment when the train is subject to different sets of adjustment parameters of the suspension, by circulations over the given segment for a given speed range and a load range.

During the first optimization campaign, a first set of adjustment parameters is predefined at each passage of the suspension system 22 over the segment. Thus, during the first optimization campaign, a plurality of first sets of parameters is defined.

Each set of parameters is randomly or arbitrarily defined. Advantageously, each parameter of the first set is selected in a predefined safety interval. One skilled in the art will be able to define this safety interval, outside which the parameters would not give the possibility of obtaining satisfactory comfort.

Upon arriving on a segment T, the first corresponding set of parameters is transmitted to the control means 28, which apply this first set of parameters to the suspension system 22.

On this segment T, the speed V and the load C are measured, and then classified in a discretized space of speed and load, these discretized values are provided to the database 14. Thus, the speed class V, the load class C and the first set of parameters are inputted into the database 14, and notably into the table of parameters 38.

The calculation means 42 then calculate a comfort quality index IQ, on the basis of the measurements provided by the sensors 24. This comfort quality index IQ depends on the parameterization of the suspension system 22. Thus, the comfort quality index IQ is also inputted into the table of parameters 38, while being associated with this first set of parameters and the speed class, load class pair.

The first optimization campaign is achieved for a predetermined number of passages of the suspension system 22 over the segment T, each of these passages being associated with a first respective set of parameters and preferably distinct.

For example, when the railway vehicle 12 circulates several times over the track during the same day, the first optimization campaign consists in applying a first respective set of parameter at each passage of the vehicle 12 over the segment T during this day.

Alternatively, the optimization campaigns are common to several vehicles 12 circulating on the same railway track. The vehicles 12 are then able to share in common the relative data to each campaign. The optimization rate is thereby increased by a group effect.

The method then includes, during this first optimization campaign, the application, by the generation means 40, of a metaheuristic algorithm to the first sets of parameters, in order to determine second sets of adjustment parameters. This metaheuristic algorithm takes into account the calculated comfort quality indexes IQ, in order to infer therefrom the parameters which seem to be the most suitable for improving the comfort over the segment T. One skilled in the art will be able to select a suitable metaheuristic algorithm.

The metaheuristic algorithm is for example a genetic algorithm. The general principle of a genetic algorithm is known per se. Starting with an initial population, an evaluation of the individuals is carried out, and then an optimization by selection, crossbreedings and mutations, in order to obtain a new optimized population. A new iteration is therefore carried out from the evaluation of the individuals.

Such a first optimization campaign is achieved on each triplet, segment T, speed class V, load class C.

It should be noted that the set of parameters to be applied on a segment T is determined while the vehicle 12 is found on the previous segment, in order to be able to parameterize the suspension system 22 as soon as the vehicle 12 enters the segment T.

An example of a metaheuristic algorithm, and notably a genetic algorithm, will now be described.

Genetic algorithms are a particular type of meta-heuristic algorithms. A genetic algorithm will be continuously applied in order to adapt the vehicle to its environment, i.e. for optimally adjusting the sets of suspension parameters so as to maximize comfort over the relevant segment.

A generation is, in practice, a sufficiently large sample of sets of evaluated parameters, which will be the basis for generating a second sample of sets of parameters to be tested. The optimization is therefore sequential. A sample may therefore consist physically of a same train which passes over a segment with different sets of parameters, or identical trains having different sets of parameters, this is the case of a train group (TGV for example) circulating on a same line. The more there are trains on a line the faster is the convergence.

Step 1: Selection of the Parameters Having an Influence on the Response of the System to the Posed Optimization Problem.

During this step 1, the parameters which one wishes to modify/optimize are defined. A sensitivity study gives the possibility of defining which dampers act the most on the comfort. The variation range of the parameters compatible with the safety of the train is defined.

Step 2: Initial Population (Random) of N Individuals.

The population (set of N sets of parameters) is defined as forming the first generation. The size N of the population is an optimization choice and does not necessary have any relationship with the number of trains being utilized. A population is also called a "generation". An individual corresponds to a set of parameters to be bested. Each set of parameters has randomly defined parameters taking into account step 1. Each parameter is coded as a real number in order to avoid conversion times.

Step 3: Evaluation of the Adaptation Capability of Each Individual (Quality Index)

Each individual (set of parameters) is evaluated relatively to the problem (each train rolls over the segment and the accelerations are recorded). A quality index IQ is inferred therefrom.

The more the individual is adapted (the better is the comfort), the higher is the quality index.

Penalties or bonuses may be applied if the maximum Comfort quality index IQ values have to be observed. These bonussed set of parameters will more likely to be selected for the following step. This operation gives us the possibility of thereby classifying the individuals by adaptability order with view to the following step.

We will pass to the next step, once the N individuals of the generation are tested and evaluated.

Step 4: Selection of the Best Adapted Parents.

The N individuals which will be used subsequently are then selected. The individuals put forward in step 3 statistically are more likely to be selected according to the roulette method which will be described below. An intermediate population consisting of N individuals (sets of parameters) a little better adapted and therefore providing better solutions (better quality indexes IQ) is obtained. An individual may be represented several times in this intermediate population.

Step 5: Reproduction by Crossbreeding.

Crossbreeding is the operation which will give the possibility of exploring the variation space of the parameters. During this operation, the parameters of the parents are combined with each other so as to form offspring having characteristics from both parents. By means of this selection process, gradually as one advances in the generations, individuals increasingly adapted are crossbred. Therefore it is more likely to obtain an even better individual at the end of the cross-breeding.

Each pair of individuals (sets of parameters) generates two child individuals (preservation of the size N of the populations over time).

The method used for the cross-breedings will be described subsequently.

Step 6: Mutation

The mutation is a random modification (but according to limits defined in step 1) of a parameter in order to widen the search space and to avoid a too rapid convergence to an optimum, which would then risk being a local optimum. Mathematically, the mutation guarantees that the global optimum may be attained.

Step 7: New Generation

One again starts from step 3 with this new obtained generation of sets of parameters. It is demonstrated mathematically that the algorithm converges towards the global solution. All the vehicles will then have the optimum set of parameters (adjustments of the dampers) giving them the possibility of providing the optimum comfort to the travelers for the given segment.

The optimization problem may change over time (wear of the tracks, of the wheels, etc.), the optimum configuration of the parameters may change. The mutation operation creating "a little different" individuals at each generation, the new generations may converge towards the new optimum and therefore follow over time the change in the environment (in so far that the variations of the environment are sufficiently slow so that the algorithm converges).

The roulette method used in step 4 will now be described.

This method consists of converting into a percentage the quality index IQ of each set of parameters, relatively to the total sum of the quality indexes IQ. N draws are then made, wherein N is the number of sets of parameters making up a generation. At each draw, each set of parameters will therefore have a probability of being selected proportional to the value of its quality index IQ. It will be noted that a same "good" set of parameters may be selected several times while a "poor" set will never be selected.

However, the reverse may occur, i.e. the best set of parameters is never selected or it is lost during cross-breedings or mutations. In order to counter this phenomenon, it is possible to conceive that after the selection process, the worst set of parameters is immediately replaced by the best set of parameters of the previous generation. This is an elitist method.

The cross-breeding method used in step 5 will now be described.

A cross-breeding probability Pc is determined, for example Pc=77%.

For each pair of sets of parameters (of chromosomes) taken randomly from the intermediate population resulting from the selection by the roulette method, a random number is drawn between 0 and 1, if this number is greater than Pc, the two individuals (sets of parameters) drawn are retained for cross-breeding. For each gene (damper parameter for example), a random number is drawn, if this number exceeds the probability p2 defined below, then both individuals exchange the gene between them and one passes to the following gene.

$$p2 = \left(0.5 - 0.35 \times \left(\left(\frac{\text{Num\_Genera}}{\text{Nb\_Genera}}\right)^{\frac{1}{2}}\right)\right) \times F \times 100$$

wherein:

Num_Genera is the index of the current generation.

Nb_Genera is the total number of generations in the algorithm.

F=1.5−(Num_Genera/Nb_Genera) if both parents meet the imposed constraints (i.e. that their parameters are actually found in the predefined intervals), otherwise F=1.

Once the first optimization campaign is finished, a second optimization campaign is performed, during which the seconds sets of parameters determined earlier with the evaluations from IQ of the first campaign are those which are provided to the control means 28, each second set of parameters corresponding to a respective passage over a given segment T, this second set of parameters being used for adjusting the suspension system 22 during this passing over the segment T.

Such a second campaign is also carried out for each triplet segment T, speed class V, load class C of the track.

In the same way as earlier, upon arriving on a segment T, the corresponding second set of parameters is transmitted to the control means 28, which apply this second set of parameters to the suspension system 22.

On this segment T, the speed V and the load C are measured, and then provided to the database 14. Thus, the speed V (its speed class), the load C (its load class) and the second set of parameters are inputted into the database 14, and notably into the table of parameters 38.

The calculation means 42 then calculate the comfort quality index IQ, on the basis of the measurements provided by the sensors 24. The comfort quality index IQ is also inputted into the table of parameters 38, while being associated with this second set of parameters.

The second optimization campaign is carried out for a predetermined number of passages of the suspension system 22 over the segment T, each of these passages being associated with a respective second set of parameters and preferably distinct.

For example, when the railway vehicle 12 circulates several times on the track during the same day, the second optimization campaign consists in applying a respective second set of parameters at each passage of the vehicle 12 on the segment T during this day.

The method then includes, during this second optimization campaign, the application, by the generation means 40, of the metaheuristic algorithm to the second set of parameters, in order to determine a third set of adjustment parameters.

Then, during each following optimization campaign, at each passage of the suspension system 22 on the segment T, one of the sets of adjustment parameters determined by the preceding optimization campaign is applied to the suspension system 22 and the comfort quality index IQ is estimated. Next, the metaheuristic algorithm is applied for determining new sets of adjustment parameters.

By again iterating the optimization campaigns, the sets of parameters converge towards optimized values.

A database of optimal parameters is thereby built continuously, depending on the relevant input variables.

It should be noted that the metaheuristic algorithm advantageously takes into account the speed of the vehicle 12 and the load borne by this vehicle 12 during the passage of this vehicle 12 over a relevant segment T.

It should be noted that the optimum search space consists of 3 axes: the Segment axis, the Speed V axis and the load C axis. In order to structure the optimization, the space is discretized on these 3 axes by classes. It is possible to view this space with cubes, each cube containing the optimization information which is the set of parameters and the associated IQs.

It clearly appears that the invention, by using a metaheuristic algorithm, gives the possibility of achieving dynamic multi-criteria optimizations. Thus, a set of parameters close to an optimum will always be proposed, notably by the "mutation" mechanism included in the general known principle of optimization by a genetic algorithm. The proposed relevance of the set of parameters is refined gradually during the optimization campaigns, in spite of the variability of the system such as for example the ageing of the tracks, corresponding to changes in the geometry. As the algorithm operates permanently, the algorithm gives the possibility of tracking these changes in the track quality and always proposes sets of parameters very close to the optimum.

It will be noted that the invention is not limited to the embodiment described earlier, but may have diverse alternatives.

The invention claimed is:

1. A comfort optimization method for optimizing comfort in a railway vehicle having multiple railway cars circulating on a railway track, the railway vehicle including at least one active suspension system parameterized by a set of adjustment parameters, wherein:
   the railway track is cut out in segments, and
   for each segment, the method comprises optimization campaigns for optimization of the set of adjustment parameters, such that:
      first sets of adjustment parameters are predefined,
      during a first optimization campaign, at each passage of the active suspension system on the segment, one of the first sets of adjustment parameters, specific to this passage, is applied to the active suspension system, and a comfort quality index is calculated, and then a metaheuristic algorithm is applied for determining second sets of adjustment parameters,
      during each following optimization campaign, at each passage of the active suspension system over the segment, one of the sets of adjustment parameters determined by the previous optimization campaign is applied to the suspension system and the comfort quality index is calculated, and then the metaheuristic algorithm is applied for determining new sets of adjustment parameters;
   wherein the optimization campaigns are common to a plurality of railway vehicles of a fleet of independent railway vehicles circulating on the same railway track, the railway vehicles then being able to put the data relative to each optimization campaign into a common database so that the information may be shared with any railway vehicle in the plurality of railway vehicles of the fleet.

2. The comfort optimization method according to claim 1, wherein the adjustment parameters of the first sets of adjustment parameters are selected in predetermined respective safety intervals.

3. The comfort optimization method according to claim 1, wherein the adjustment parameters of the first sets of adjustment parameters are determined randomly.

4. The comfort optimization method according to claim 3, wherein the metaheuristic algorithm is a genetic algorithm.

5. The comfort optimization method according to claim 1, wherein the metaheuristic algorithm is a genetic algorithm.

6. The comfort optimization method according to claim 1, wherein the cutting out of the railway track in segments is adaptive, with segments of variable lengths, established according to singularities of the railway track.

7. A comfort control device in a railway vehicle having multiple railway cars, for applying a comfort optimization method, comprising:
   at least one active suspension system, adjustable based on a set of adjustment parameters,
   a system for controlling the set of adjustment parameters of the active suspension system,
   a software device for evaluating passenger comfort in the railway vehicle, and
   an optimization device including a database able to determine optimized sets of adjustment parameters by carrying out a plurality of optimization campaigns as follows:
   on a railway track cut out in segments, for each segment, the optimization campaigns are such that:
      during a first optimization campaign, at each passage of the active suspension system on the segment, a first set of adjustment parameters, specific to this passage, is predefined and applied to the active suspension system, and a comfort quality index is calculated, and then a metaheuristic algorithm is applied for determining second sets of adjustment parameters,
      during each following optimization campaign, at each passage of the active suspension system over the segment, one of the sets of adjustment parameters determined by the previous optimization campaign is applied to the suspension system and the comfort quality index is calculated, and then the metaheuristic algorithm is applied for determining new sets of adjustment parameters;
   wherein the optimization campaigns are common to a plurality of railway vehicles of a fleet of independent railway vehicles circulating on the same railway track, the railway vehicles then being able to put the data relative to each optimization campaign into a common database so that the information may be shared with any railway vehicle in the plurality of railway vehicles of the fleet.

8. The comfort control device according to claim 7, wherein the optimization device is able to be updated at each optimization campaign, indicating the set of adjustment parameters according to track segments, speeds and loads of the vehicle.

9. The comfort control device according to claim 7, wherein the optimization device include a generation device for generating optimized sets of adjustment parameters by the metaheuristic algorithm, able to generate a set of optimized adjustment parameters by applying the metaheuristic algorithm to the set of adjustment parameters determined during a previous optimization campaign.

* * * * *